Feb. 26, 1929.

C. G. ANDERSON 1,703,711

THERMOSTATIC PLUG CONTROL FOR ELECTRIC IRONS, ETC

Filed Sept. 7, 1926     4 Sheets-Sheet 1

Inventor.
Carl G. Anderson
by Heard Smith & Tennant.
Attys.

Feb. 26, 1929.  1,703,711
C. G. ANDERSON
THERMOSTATIC PLUG CONTROL FOR ELECTRIC IRONS, ETC
Filed Sept. 7, 1926    4 Sheets-Sheet 2

Inventor.
Carl G. Anderson
by Heard Smith & Tennant.
Attys.

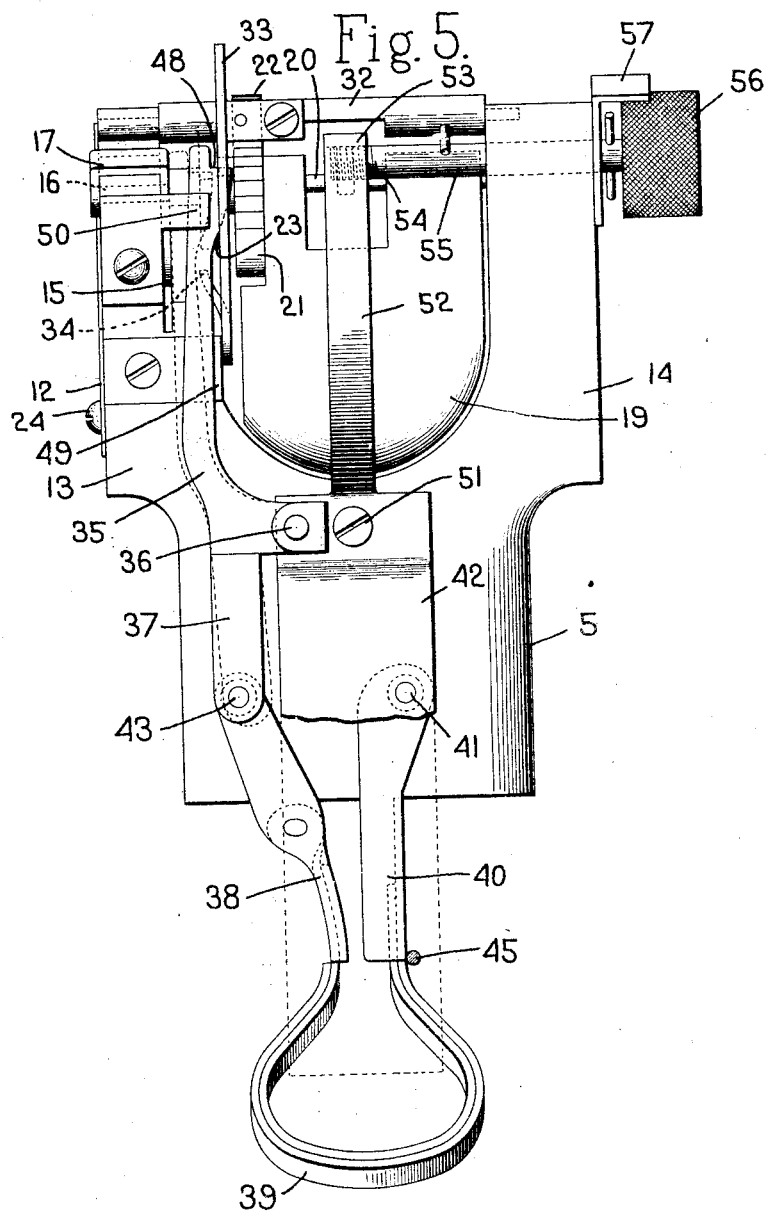

Feb. 26, 1929.
C. G. ANDERSON
1,703,711
THERMOSTATIC PLUG CONTROL FOR ELECTRIC IRONS, ETC
Filed Sept. 7, 1926  4 Sheets-Sheet 4
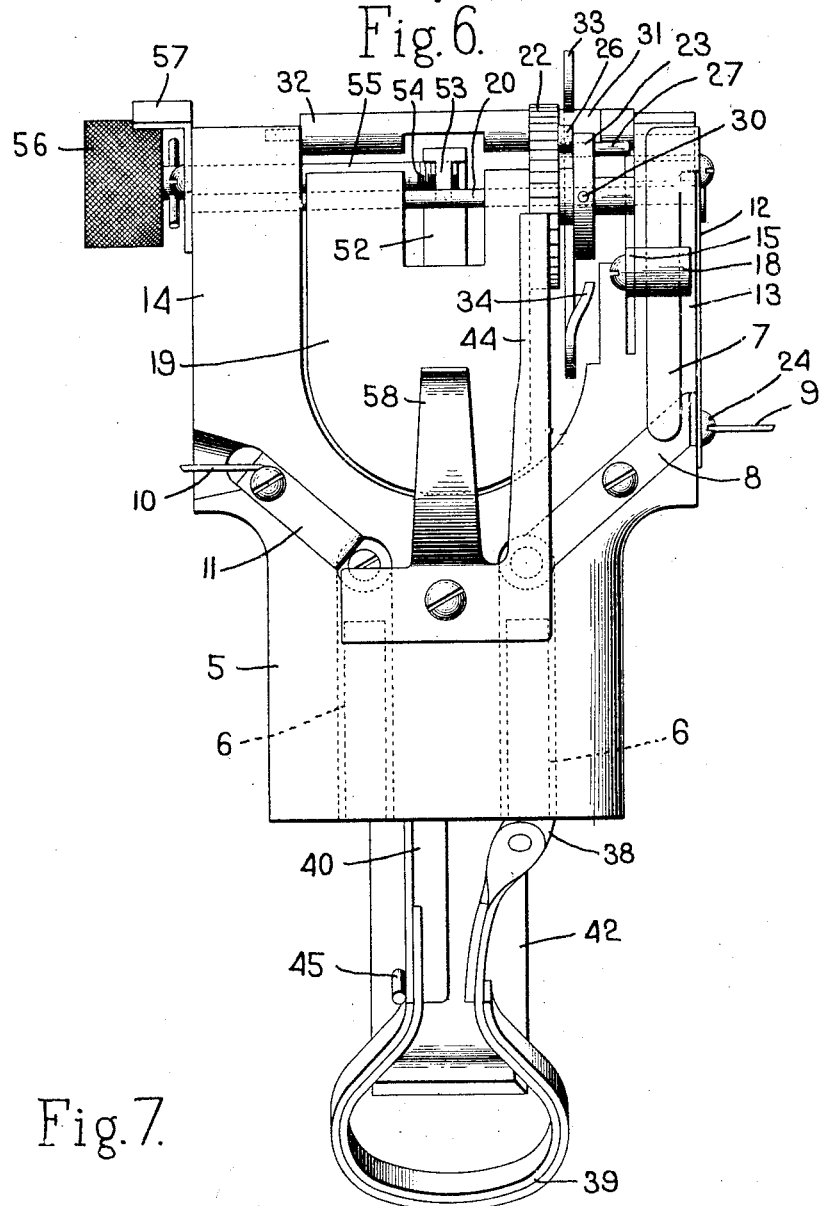
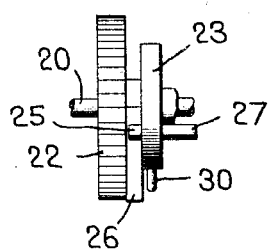
Inventor.
Carl G. Anderson
by Heard Smith & Tennant.
Attys.

Patented Feb. 26, 1929.

1,703,711

UNITED STATES PATENT OFFICE.

CARL G. ANDERSON, OF BOSTON, MASSACHUSETTS, ASSIGNOR, BY DIRECT AND MESNE ASSIGNMENTS, OF THREE-EIGHTHS TO MABEL M. HORGAN, AND FIVE-EIGHTHS TO GRACE NOYES SANBORN, BOTH OF MANCHESTER, NEW HAMPSHIRE.

THERMOSTATIC PLUG CONTROL FOR ELECTRIC IRONS, ETC.

Application filed September 7, 1926. Serial No. 133,781.

This invention relates to a novel thermostatic device for controlling electrically heated devices such as flat irons so as to prevent them from getting overheated, and so as to maintain them at the desired operating temperature.

One object of the invention, is to provide a novel controlling device involving a switch which is normally open but which is closed automatically by the to-and-fro movement of the flat iron as it is used, and further to provide a novel mechanism by which the switch will be automatically opened when the flat iron has reached a predetermined temperature and will remain open so long as the temperature of the flat iron remains above the predetermined point.

A further object of the invention is to provide a novel controlling device which is so constructed that after the switch has been opened by the operation of the thermostat, said switch can be closed again only by the movement which is given to the iron when it is in use. The advantage of this feature is that so long as the iron is not in use the switch will remain open and will only be closed when the iron is being used.

In order to give an understanding of the invention, I have illustrated a selected embodiment thereof which will now be described after which the novel features will be pointed out in the appended claims.

In the drawings:

Fig. 5 is a view of the device shown in Fig. 3 looked at from the right.

Fig. 6 is a view of the thermostatic device shown in Fig. 3 looked at from the left.

Fig. 7 is a view of the ratchet mechanism which is operated by the oscillation of the pendulum.

Figure 1:
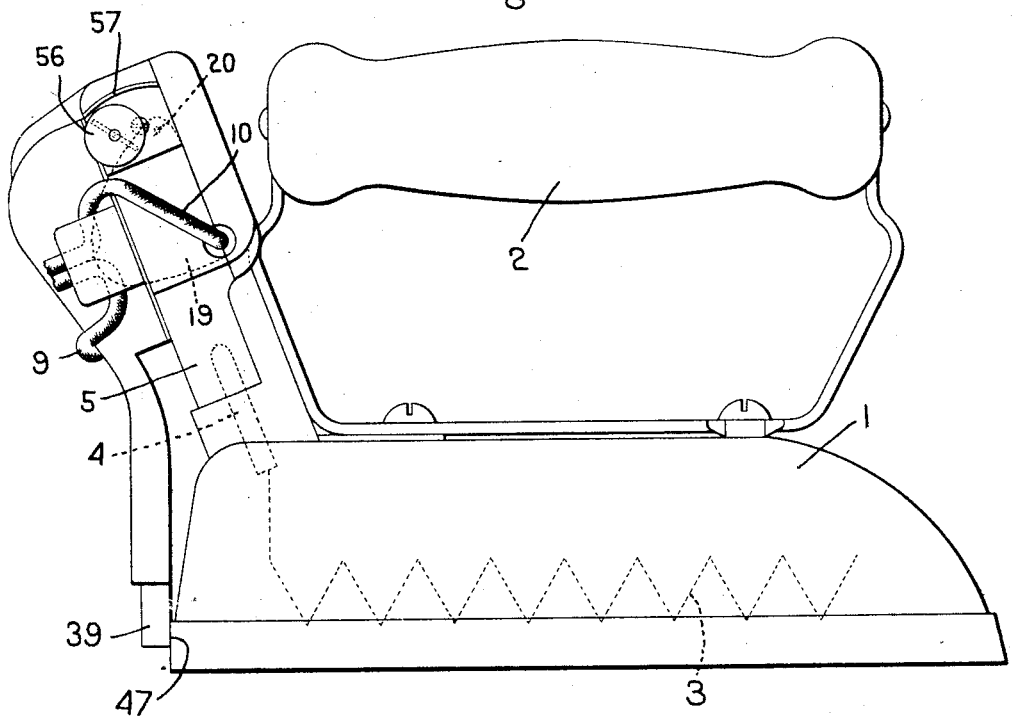
Fig. 1 is a side view of the electric flat iron embodying my invention.

In the drawings, 1 indicates an ordinary electric flat iron having the usual handle 2 and also provided with a suitable heating coil which is illustrated diagrammatically at 3. The iron is also provided with the usual two terminals, one of which is shown at 4, to which the heating coil 3 is connected, these terminals being adapted to receive the socket plug of the electric connection. This socket plug is indicated at 5 and it is formed with the two socket terminals 6 that are adapted to receive the terminals 4 of the iron, all as usual in electric flat irons.

In the present invention, the socket connection 5, which is of insulating material, as usual, has a special construction for the purpose of supporting a thermostatically controlled switch which in turn controls the circuit to the heating coil 3. This switch comprises the two contact members 7 and 8, 7 being a movable contact and 8 a fixed contact. The fixed contact 8 is secured to the connection 5 and is electrically connected to one of the socket terminals 6. The movable contact 7 is electrically connected to one of the lead wires 9 by connections presently to be described. The other lead wire 10 is connected by an electrical connection 11 to the other socket terminal 6. With this construction it will be seen that when the contacts 7 and 8 are closed, the circuit through the coil 3 will be closed and when the contacts 7 and 8 are separated, the circuit supplying current to the coil 3 will be opened.

In the present invention the contacts 7 and 8 are normally open and means are provided whereby when the iron is taken up for use and the ironing operation is begun, the contacts 7 and 8 will be automatically closed, thus closing the circuit of the iron and heating the latter. Furthermore, the construction is such that when the temperature of the iron reaches a predetermined point, the contacts 7 and 8 will be automatically opened and if the iron is not in use, the contacts will remain open, notwithstanding the cooling of the iron, until the iron is used again. If, however, the iron is being used continuously then as soon as the temperature of the iron falls below the predetermined point, the contacts will be automatically closed again.

The movable contact 7 is in the nature of a spring arm and is secured at its upper end to a plate 12 that in turn is secured to the socket connection 5 of insulating material.

The upper end of this socket connection is forked for reasons which will be presently described, thereby presenting the two arms 13 and 14. The plate 12 is shown as secured to the side of the arm 13 and said plate leads to a binding post 24 to which the lead wire 9 is secured. The circuit connection between the circuit wire 9 and the terminal 6 therefore comprises the binding post 24, the plate 12, the contact arm 7, and the contact 8.

As stated above, the invention includes means for closing the contacts 7 and 8 which means are actuated by the to-and-fro movement which is given to the iron during the ironing operation.

Figure 3:
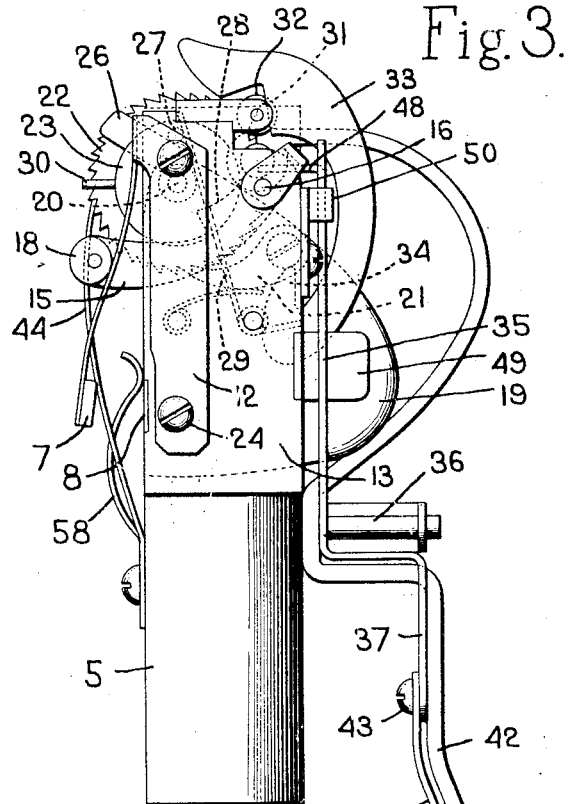
Fig. 3 is a side view of the thermostatic controlling device removed from the iron.

The movable contact 7 is a resilient arm and its resiliency normally holds it separated from the contact 8 as shown in Fig. 3. The contacts are closed together by a switch-closing member 15 in the form of an arm pivoted at 16 to the arm 13 of the member 5. The upper end of this arm 15 is bent to present the yoke portion 17 which embraces the arm 13 of the member 5. The two sides of the yoke are pivotally mounted on the pin 16 which extends through the arm 17. This switch-closing member 15 is provided at its free end with a laterally extending insulated finger 18 which bears against the contact 7 as shown in Fig. 3. When the switch-closing arm 15 is swung downwardly about its pivot 16, the projection 18 will press the contact 7 backwardly and close it on to the contact 8 as shown by dotted lines in Fig. 4.

This movement is given to the switch-closing arm 15 by the vibratory movement of the iron when it is being used. For this purpose, I have provided a pendulum weight 19 which is located in the space between the arms 13 and 14 of the member 5 and which is pivotally mounted on a pin or rod 20 carried by said arms 13 and 14 so that as the iron is moved back and forth while being used the weight 19 will be given an oscillating movement. This pendulum weight 19 has a spring pressed pawl 21 mounted thereon which co-operates with the ratchet wheel 22 that is loosely mounted on the pin 20. The vibratory movement of the pendulum weight 19 will therefore step the ratchet member 22 forward intermittently and the pendulum is so constructed that the back and forth or vibrating movement which is naturally given to the iron during the ironing operation will serve to give the pendulum weight its operative vibrating movement.

44 is a resilient detent or stop arm which engages the ratchet wheel 22 and prevents backward movement thereof.

Loosely mounted on the pin or rod 20 is a disc 23 which has on one face a projection 25 which is adapted to be engaged by a projection 26 fast on one face of the ratchet wheel 22 as said ratchet wheel turns. The disc 23 is provided with another lateral projection 27 which is adapted to engage a cam surface 28 formed on the switch-closing arm 15, as said disc 23 rotates.

Normally, when the iron is not in use, the disc 23 will be in a position shown in Fig. 3 and the contacts 7 and 8 will be open, the disc being held in this position by a spring 29 which engages the projection 27. When the iron is put in use, the vibratory movement thereof will cause the pendulum 19 to oscillate, such oscillating movement stepping the ratchet 22 forward intermittently. As the ratchet turns, the projection 26 on one face thereof engages the projection 25 on the disc 23, and thereafter the rotation of the ratchet 22 will be communicated to the disc 23. As the disc rotates, the projection 27 thereon is brought into engagement with the cam surface 28 and as the projection 27 rides over the surface 28, the arm 15 will be moved downwardly into the position shown in Fig. 4 thus swinging the contact 7 into engagement with the contact 8 and closing the circuit through the iron.

Thus, although the circuit is open when the ironing operation begins, yet it is automatically closed as soon as the iron has been moved back and forth a few times.

Figure 4:
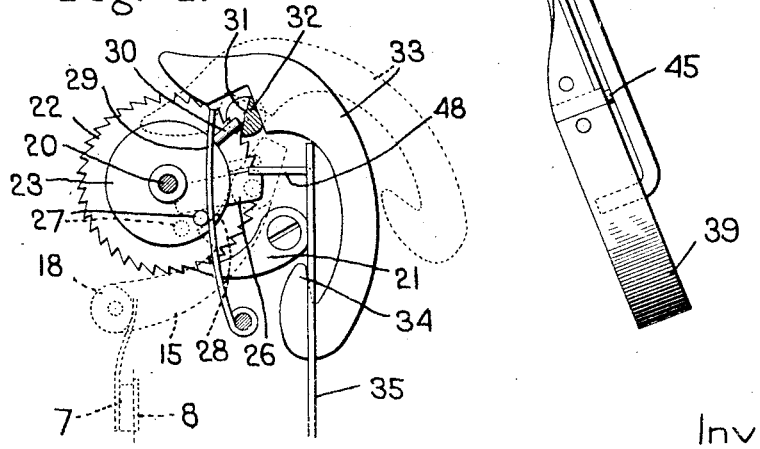
Fig. 4 is a section on the line 4—4 Fig. 5.

Means are provided for stopping the rotation of the disc 23 when the circuit is thus closed and while the projection 27 is still in engagement with the cam 28 as seen in Fig. 4 so that the switch will remain closed. And means are also provided for automatically opening the contacts 7 and 8 when the temperature of the iron reaches a predetermined point.

It will be remembered that the spring 29 is bearing against the projection 27 when the parts are in the position shown in Fig. 3, and therefore as the disc 23 rotates forwardly or clock-wise in Fig. 3 the spring will be flexed and placed under tension, said spring opposing forward rotation of the disc 23 until the projection passes the dead center as it were, and then tending to move the disc forwardly.

The rotation of the disc 23 is restrained when the switch-closing arm 15 is brought into the position shown in Fig. 4 and while the projection is still on the cam face 28 by means of a stop pin 30 which extends radially from the disc and is adapted to engage the slabbed off surface 31 of a rock shaft 32 that is journalled in the arms 13 and 14 of the member 5 as seen in Fig. 4.

This projection 30 engages the surface 31 below the axis of the rock shaft 32 and therefore the pressure of the pin against said surface due to the tension of the spring 29 has a tendency to turn the rock shaft into a position to release the pin 30, but this is prevented by a latch member 33 which is fast to the rock shaft 32 and which has an offset finger 34 that engages a restraining arm 35 as seen in Figs. 4 and 5. The switch is thus locked in closed relation, and the ratchet wheel will also be locked thus locking the pendulum weight from swinging movement. The parts remain in this condition until the iron reaches a predetermined temperature, at which time the disc 23 is released and allowed to turn forwardly from the full to the dotted line position Fig. 4 which will carry the projection 27 off from the cam surface 28 and allow the switch to open due to the resiliency of the contact arm 7. This release of the disc is accomplished through the medium of a thermostat 39.

The thermostat 39 is a U shaped member and one arm 40 thereof is connected at 41 to a bracket member 42 which in turn is secured to the insulating member 5. The other arm 38 of the thermostat is pivotally connected at 43 to the end 37 of the restraining arm 35, the latter being pivoted to the bracket 42 at 36.

The thermostat is so constructed that when it is heated the arms 38 and 40 tend to move toward each other. The arm 40 is held from movement relative to the bracket 42 by means of a pin 45 which engages the outside of the arm 40 and a flange 46 on the lower end of the bracket which engages the inside of said arm. As a result, the contact or expanding movement of the U shaped member results in giving lateral movement to the arm 38. The thermostat is so supported and positioned that the U shaped portion thereof rests against the end of the iron as shown at 47, and consequently the thermostat will contract or expand as the iron is heated or cooled. When the thermostat contracts by reason of the iron being heated, the movement of the arm 38 thereof toward the arm 40 or toward the right in Fig. 5 will operate to swing the restraining arm 35 from the full to the dotted line position Fig. 5, and this movement will carry the said restraining member out of engagement with the finger 34 thereby releasing the latch 33.

It will be remembered that when the parts are in the position shown in Fig. 4 the spring 29 is under tension and is acting against the pin 27 tending to rotate the disc 23 clockwise. As soon as the latch 33 has been released by the lateral movement of the restraining member 35, the pressure of the pin 30 against the surface 31 due to the action of the spring 29 will turn the rock shaft 32 and latch 33 into the dotted line position Fig. 4 thus releasing the disc 23 and allowing it to turn clock-wise under the influence of the spring 29.

As stated above, this turning movement of the disc is sufficient to carry the projec- tion 27 off from the cam surface 28 thus allowing the contacts 7 and 8 to be opened by the resiliency of the contact arm 7.

After the switch-closing contacts 7, 8 have thus been opened by action of the thermostat 39, said contacts will remain open so long as the temperature of the iron remains above the predetermined point, and will also remain open even though the iron cools unless the iron is being given a to-and-fro motion such as is naturally given to it by the operation of ironing.

The restraining member 35 is provided with a laterally extending finger 48 which is situated so that when the restraining member is moved into the dotted line position Fig. 5 said finger comes into the path of movement of the pin 30 and hence when the pin 30 is released from the rock shaft 32 the disc 23 will turn until said pin strikes the finger 48 as shown by dotted lines Fig. 4. The movement which the disc has in traveling from the full to the dotted line position Fig. 4 is sufficient to carry the projection 27 off from the cam surface 28. So long as the iron remains at or above the predetermined temperature the restraining member 35 will be held in the dotted line position Fig. 5 and the disc 23 will thus be held from rotative movement. When the iron cools, however, the consequent expanding movement of the thermostat will swing the restraining member 35 laterally into the full line position Fig. 5 thus carrying the finger 48 out of the path of movement of the pin 30 and releasing the disc 23 for further forward movement. If at this time the iron is idle, then of course the switch will remain open. If, however, the iron is being used and is being given a to-and-fro motion, such motion will vibrate the pendulum weight 19 and the vibrating movement of the latter will step the ratchet 22 and the disc 23 forward as above described, the forward rotation of the ratchet and disc continuing until the switch contacts 7 and 8 are closed again and the further forward motion of the disc is restrained by engagement of the pin 30 with the surface 31 as shown in Fig. 4.

49 indicates a stop member which limits the swinging movement of the restraining member to the right Fig. 5. 50 is a guide finger which overlies the other end of the restraining member and guides it in its movement.

The mechanism herein shown is also provided with means for adjusting the action of the thermostat so that it will operate at any desired temperature. For this purpose the bracket member 42 which carries the thermostat is pivoted to the member 5 as shown at 51 and said bracket has a curved arm 52 rising therefrom which has at is upper end a nut 53 that has screw threaded engagement with the screw threaded portion of an adjusting member 55 that is journalled in the arm 14 of the member 4. This adjusting member 55 is provided with a head 56 by which it may be turned. The turning of the adjusting member operates to move the nut 53 toward the right or the left Fig. 5 thereby swinging the bracket member 42 about its pivot 51 and adjusting the position of the thermostat with reference to the member 35. Associated with the head 56 is an index plate 57 which may be provided with suitable graduations to assist in proper adjustments of the thermostat. It may be sufficient simply to place the letters " L " and " H " on the index plate 57, one letter being at one end and the other at the other end. These letters will be so placed that when the head 56 is turned toward the letter " H " it will indicate that the thermostat is adjusted for a higher temperature and when the head is turned toward the letter " L " the thermostat will be adjusted for a lower temperature.

58 indicates a spring arm positioned to be engaged by the pendulum weight 19 as it swings forwardly, said arm serving as a resilient stop to limit the forward movement of the pendulum. The backward movement of the pendulum is limited by the engagement of the curved arm 52.

From the above it will be seen that the invention involves a device comprising a switch which is normally opened but which is closed by a vibrating movement of the flat iron, and means whereby the switch will be automatically opened again when the flat iron reaches a predetermined temperature. It will also be seen that the device comprises means whereby when the switch has thus been opened it will remain open regardless of the temperature of the iron unless the iron is still being given a to-and-fro motion, in which case the switch will be automatically closed again as soon as the temperature of the iron falls below a predetermined or desired point. The device therefore affords complete protection for the iron and provides means whereby the current will be cut off from the iron when it is not in use and will remain so cut off even though the cord to which the iron is connected may remain connected to the lamp socket or the wall plug.

Figure 2:
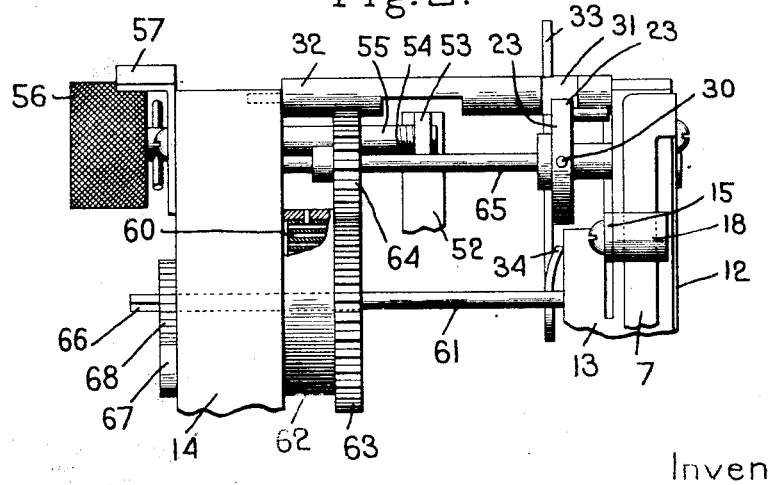
Fig. 2 is a fragmentary view showing the embodiment of the invention.

In Fig. 2 I have illustrated a different embodiment of the invention in which a spring is substituted for the pendulum weight 19. This spring is shown at 60 and it is similar to a clock spring, one end of which is connected to the shaft 61 and the other end of which is connected to the spring barrel 62 which houses the spring and which is rigid with a gear 63. This gear 63 meshes with a gear 64 on a shaft 65 which has fast thereon the disc 23. The end 66 of the shaft 61 is squared to receive a wrench or other tool for winding the spring, 67 indicating a stop pawl co-operating with a ratchet 68 to prevent the spring from unwinding. In other respects the construction shown in Fig. 2 is similar to that above described.

With this construction the closing of the switch will be accomplished automatically by the action of the spring whenever the temperature of the iron falls below a predetermined amount regardless of whether the iron is being used or not, the switch being opened by the thermostat in the manner above described.

I claim:

1. In an electric flat iron, the combination with a heating unit, of a normally open circuit therefor, means actuated by the to-and-fro movement of the iron when the latter is used to close the circuit, and means to open the circuit when said iron reaches a predetermined temperature.

2. In an electric flat iron, the combination with a heating unit, of a normally open circuit therefor, means actuated by the to-and-fro movement of the iron when the latter is used to close said circuit, and means including a thermostat device to open the circuit when the iron reaches a predetermined temperature.

3. In an electric flat iron, the combination with a heating unit, a circuit therefor, means to open the circuit when the iron reaches a predetermined temperature, and means actuated by the to-and-fro movement of the iron to close the circuit when the temperature of said iron falls below a predetermined point.

4. In a device of the class described, the combination with an automatically opening switch for controlling an electric circuit, of a switch-closing lever having a cam surface, a rotatable member adapted by its rotation to engage said surface and move the lever to close the switch and thermostatically controlled means to release the lever thereby to allow the switch to open.

5. In a device of the class described, the combination with an automatically-opening switch for controlling an electric circuit, of a switch-closing lever having a cam surface, a rotatable member adapted to engage said cam surface and actuate the lever to close the switch, means to bring the rotatable member to rest with the switch closed, a thermostatic device to release the last named means when a predetermined temperature is reached thereby to allow the rotatable member to continue its rotation into a position in which the switch will open automatically.

6. In an electric flat iron, the combination with a heating unit, of a circuit therefor, means to open the circuit when the iron reaches a predetermined temperature and to maintain said circuit open so long as said predetermined temperature continues, and means actuated by the to-and-fro movement of the iron to close the circuit, said means being inoperative while the temperature is above the predetermined point and becoming operative only when the temperature falls below said predetermined point.

7. In an electric flat iron, the combination with a heating unit, of a circuit therefor, an automatically-opening switch in said circuit, a switch-closing lever by the movement of which the switch is closed, means actuated by the to-and-fro movement of the iron to operate said lever thereby to close the switch, and thermostatically-controlled means to release the lever and thus allow the switch to open.

8. In an electric flat iron, the combination with a heating unit, of a circuit therefor, means to open the switch when the iron reaches a predetermined temperaure, a pendulum member which is oscillated by the to-and-fro movement of the iron, and means actuated by the oscillating motion of said pendulum member to close the circuit.

9. In an electric flat iron, the combination with a heating unit, of a normally-open circuit therefor, a pendulum member which is oscillated by the to-and-fro movement of the iron when the latter is used, and means actuated by the pendulum member to close the circuit.

10. In an electric flat iron, the combination with a heating unit, of a normally-open circuit therefor, a pendulum member which is oscillated by the to-and-fro movement of the iron when the latter is used, means actuated by the pendulum member to close the circuit, and means to open the circuit when the iron reaches a predetermined temperature.

11. In an electric flat iron, the combination with a heating unit, of a circuit therefor, means to open the circuit when the temperature of the iron reaches a predetermined point, a pivoted pendulum member which is oscillated by the to-and-fro movement of the iron, means actuated by the oscillations of said pendulum member to close the circuit, said pendulum member becoming inoperative after the circuit is closed, and means for rendering the pendulum member inoperative after the circuit has closed and until the temperature of the iron falls below said predetermined point.

In testimony whereof, I have signed my name to this specification.

CARL G. ANDERSON.